US012613997B2

(12) United States Patent
Elias et al.

(10) Patent No.: US 12,613,997 B2
(45) Date of Patent: Apr. 28, 2026

(54) MULTI-STEP PROCESS FOR AUTHENTICATING ACCESS BY A USER TO A DATABASE

(71) Applicant: TOYOTA JIDOSHA KABUSHIKI KAISHA, Aichi-ken (JP)

(72) Inventors: Pablo Elias, Kanagawa-ken (JP); Thang Minh Vu, Fuchu (JP); Ellie Choi, Tokyo-to (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 56 days.

(21) Appl. No.: 18/626,339

(22) Filed: Apr. 4, 2024

(65) Prior Publication Data

US 2025/0315554 A1      Oct. 9, 2025

(51) Int. Cl.
*G06F 21/00*          (2013.01)
*G06F 21/62*          (2013.01)

(52) U.S. Cl.
CPC ................................ *G06F 21/6254* (2013.01)

(58) Field of Classification Search
CPC .................................................. G06F 21/6254
See application file for complete search history.

(56) References Cited

U.S. PATENT DOCUMENTS

| | | | | |
|---|---|---|---|---|
| 2020/0259655 A1* | 8/2020 | Woo | .......................... | H04W 4/44 |
| 2021/0083873 A1* | 3/2021 | Harris | ................... | H04L 9/3297 |
| 2021/0101563 A1* | 4/2021 | Azarko | ................ | B60R 25/241 |
| 2022/0417028 A1 | 12/2022 | Zilbershtein et al. | | |
| 2023/0075296 A1* | 3/2023 | Morley, III | ......... | H04L 63/0807 |
| 2024/0220968 A1* | 7/2024 | Pearce | ................... | G06Q 20/02 |
| 2024/0256709 A1* | 8/2024 | St. Gray | ............. | G06F 21/6254 |

* cited by examiner

*Primary Examiner* — Ghazal B Shehni

(74) *Attorney, Agent, or Firm* — HAUPTMAN HAM, LLP

(57)          ABSTRACT

A method, system, and non-transitory computer-readable media for authenticating access by a user to a database using a multi-step process. A User Request is received at a Gateway API for accessing a Database (or other type of controlled resource), the User Request including a User Authorization Token, a Request Identification (ID), and an Event Date. The user is authenticated by the Gateway API based on the User Authorization Token. In response to the user not being authenticated at the Gateway API based on the User Authorization Token, user access to the Database is denied. In response to the user being authenticated at the Gateway API based on the User Authorization Token, an Authenticated Request is provided from the Gateway API to an API Handler based on the User Request. Based on the Authenticated Request, the API Handler obtains, from an Access Credential Server, a Service Key for accessing the Database by the API Handler. The API Handler accesses the Database using the Service Key.

20 Claims, 5 Drawing Sheets

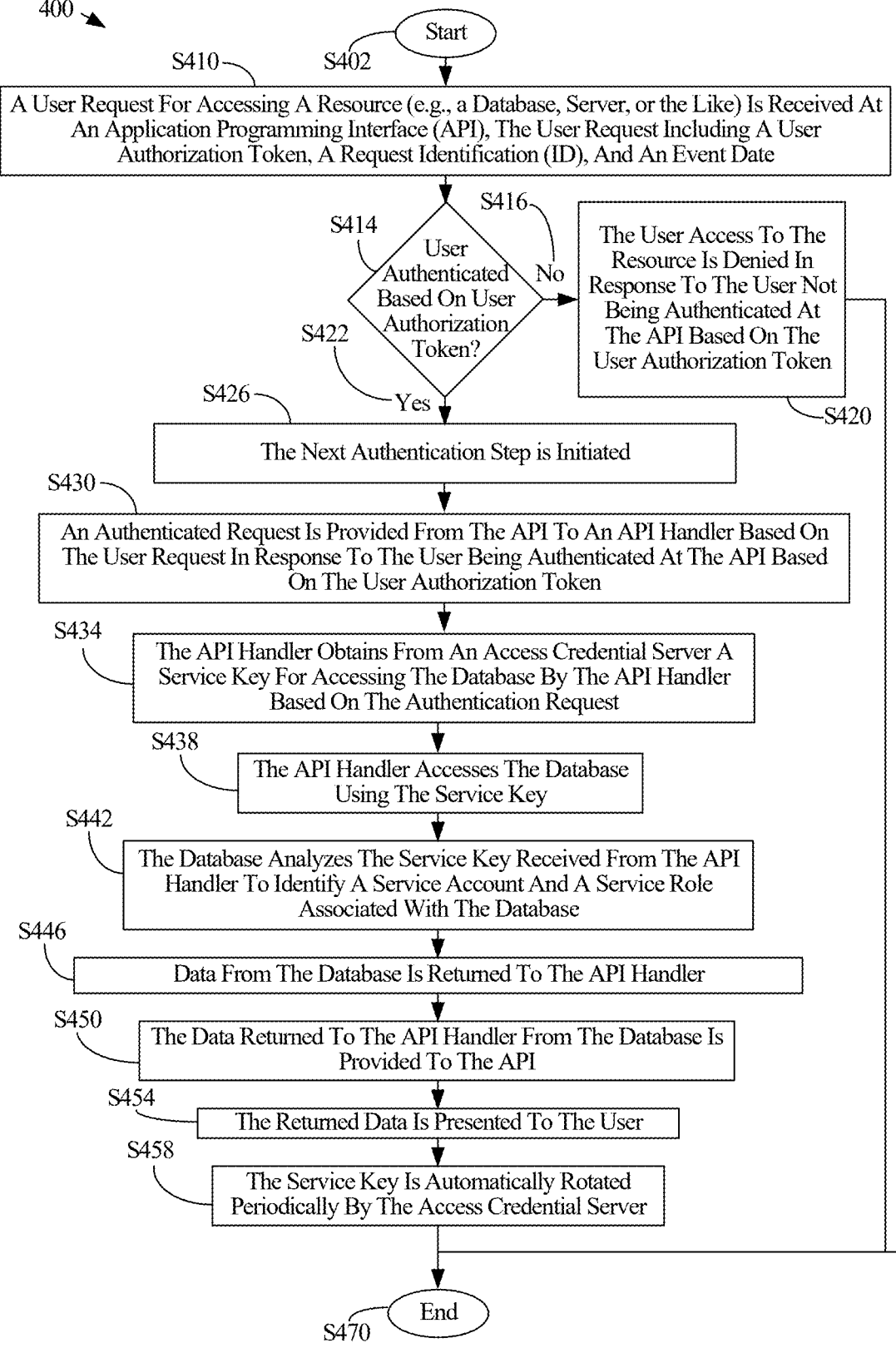

400

S402 — Start

S410 — A User Request For Accessing A Resource (e.g., a Database, Server, or the Like) Is Received At An Application Programming Interface (API), The User Request Including A User Authorization Token, A Request Identification (ID), And An Event Date

S414 — S416

User Authenticated Based On User Authorization Token?

No → The User Access To The Resource Is Denied In Response To The User Not Being Authenticated At The API Based On The User Authorization Token — S420

S422 — Yes

S426 — The Next Authentication Step is Initiated

S430 — An Authenticated Request Is Provided From The API To An API Handler Based On The User Request In Response To The User Being Authenticated At The API Based On The User Authorization Token S434 — The API Handler Obtains From An Access Credential Server A Service Key For Accessing The Database By The API Handler Based On The Authentication Request S438 — The API Handler Accesses The Database Using The Service Key S442 — The Database Analyzes The Service Key Received From The API Handler To Identify A Service Account And A Service Role Associated With The Database S446 — Data From The Database Is Returned To The API Handler S450 — The Data Returned To The API Handler From The Database Is Provided To The API S454 — The Returned Data Is Presented To The User S458 — The Service Key Is Automatically Rotated Periodically By The Access Credential Server S470 — End

Fig. 4

MULTI-STEP PROCESS FOR AUTHENTICATING ACCESS BY A USER TO A DATABASE

TECHNICAL FIELD

This description relates to a multi-step process for authenticating access by a user to a database, and method of using the same.

BACKGROUND

The demand of the market for intelligent driving function is increasing, and the safety is an influencing factor to win the trust of the customers for intelligent driving. Safety tests include site tests, open road performance verification, and virtual verification at the initial stage of development. The degree of simulation of the virtual scene determines the comprehensiveness of Advanced Driver Assistance Systems (ADAS) and safety performance verification of the autonomous driving system. The current development processes of the ADAS system and the automatic driving system need to pass through MIL (model in loop), SIL (software in loop), HIL (hardware in loop), DIL (driver in loop) and VIL (whole vehicle in loop). The driving scene library is a significant part in the development process and runs through the development process.

AV systems use sensors within the vehicle to collect information regarding the performance of the vehicle or information related to an environment surrounding the vehicle. This information is able to be transmitted to a central server for review and analysis in order to help improve performance of the vehicle or gather information related to environments through which the vehicle travels. In some instances, third parties, such as application developers, insurance companies, or government agencies, submit inquiries for information related to vehicle performance or the environment surrounding the vehicle. An AV collects a large amount of data per day, and the data is stored on a server, e.g., a Market Data Collection (MDC) server. An Ego Vehicle API interface is used to store data in the MDC databases.

SUMMARY

In at least embodiment, a method for authenticating access by a user to a database using a multi-step process includes receiving a User Request for accessing a Database, the User Request including a User Authorization Token, a Request Identification (ID), and an Event Date. The user is authenticated based on the User Authorization Token. In response to the user not being authenticated based on the User Authorization Token, the user is denied access to the Database. In response to the user being authenticated based on the User Authorization Token, an Authenticated Request is provided to an Access Credential Server based on the User Request. Based on the Authenticated Request, a Service Key for accessing the Database is obtained from the Access Credential Server. The Database is accessed using the Service Key.

In at least one embodiment, a system for authenticating access by a user to a database using a multi-step process, includes a memory storing computer-readable instructions, and a processor connected to the memory, wherein the processor is configured to execute the computer-readable instructions to perform operations to receive a User Request for accessing a Database, the User Request including a User Authorization Token, a Request Identification (ID), and an Event Date. The user is authenticated based on the User Authorization Token. In response to the user not being authenticated based on the User Authorization Token, the user is denied access to the Database. In response to the user being authenticated based on the User Authorization Token, an Authenticated Request is provided to an Access Credential Server based on the User Request. Based on the Authenticated Request, a Service Key for accessing the Database is obtained from the Access Credential Server. The Database is accessed using the Service Key.

In at least one embodiment, a non-transitory computer-readable media having computer-readable instructions stored thereon, which when executed by a processor causes the processor to perform operations including receiving a User Request for accessing a Database, the User Request including a User Authorization Token, a Request Identification (ID), and an Event Date. The user is authenticated based on the User Authorization Token. In response to the user not being authenticated based on the User Authorization Token, the user is denied access to the Database. In response to the user being authenticated based on the User Authorization Token, an Authenticated Request is provided to an Access Credential Server based on the User Request. Based on the Authenticated Request, a Service Key for accessing the Database is obtained from the Access Credential Server. The Database is accessed using the Service Key.

BRIEF DESCRIPTION OF THE DRAWINGS

Aspects of the present disclosure are best understood from the following detailed description when read with the accompanying figures. It is noted that, in accordance with the practice in the industry, various features are not drawn to scale. In fact, the dimensions of the various features are able to be increased or reduced for clarity of discussion.

FIG. 4 is a flowchart of a method for authenticating access by a user to a resource (e.g., a Database, a Server, or the like) using a multi-step process according to at least one embodiment.

DETAILED DESCRIPTION

Figure 1:
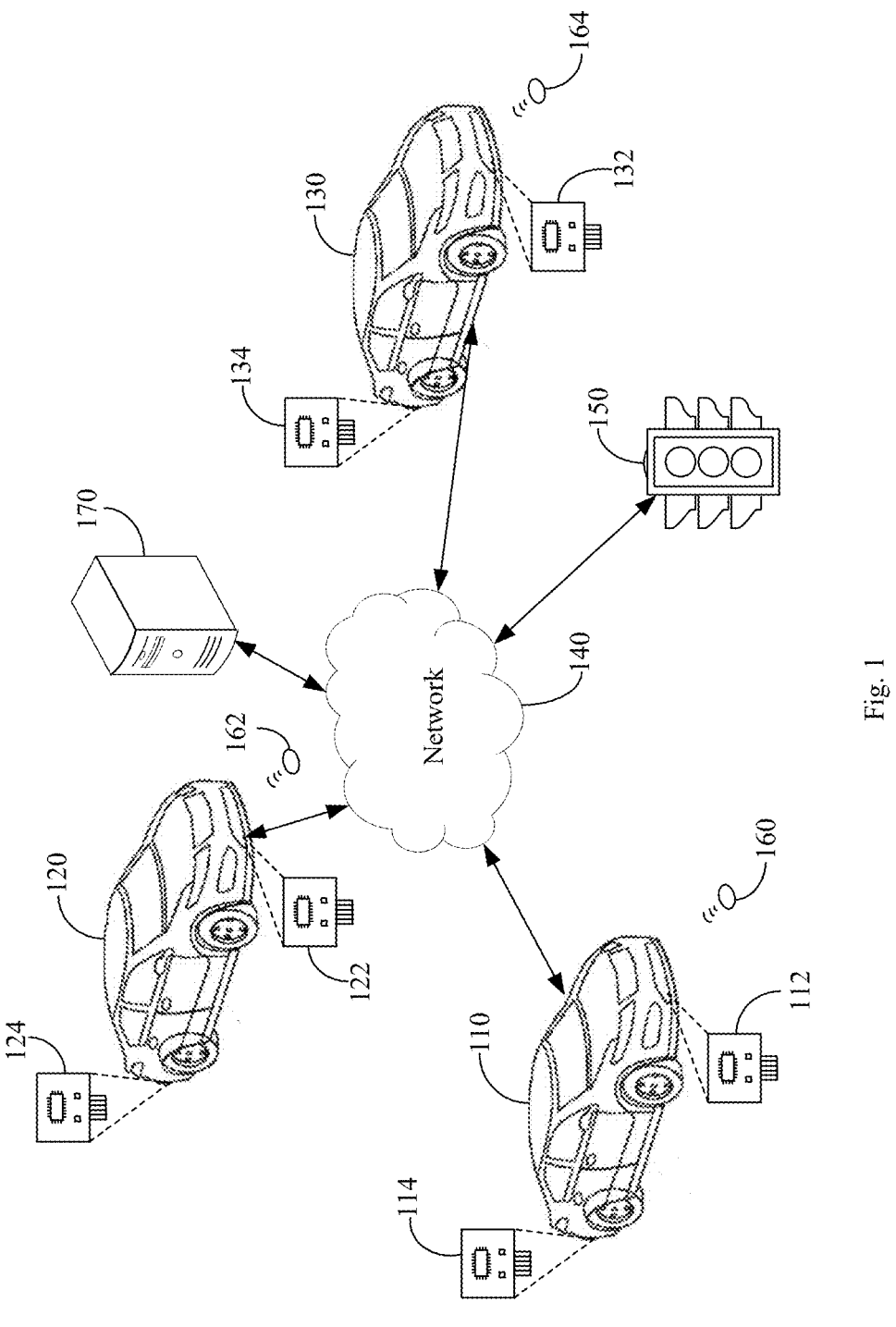
FIG. 1 illustrates data collection in an autonomous driving environment according to at least one embodiment.

Embodiments described herein describe examples for implementing different features of the provided subject matter. Examples of components, values, operations, materials, arrangements, or the like, are described below to simplify the present disclosure. These are, of course, examples and are not intended to be limiting. Other components, values, operations, materials, arrangements, or the like, are contemplated. For example, the formation of a first feature over or on a second feature in the description that follows include embodiments in which the first and second features are formed in direct contact and include embodiments in which additional features are formed between the first and second features, such that the first and second features are unable to make direct contact. In addition, the present disclosure repeats reference numerals and/or letters in the various examples. This repetition is for the purpose of simplicity and clarity and does not in dictate a relationship between the various embodiments and/or configurations discussed.

Further, spatially relative terms, such as "beneath," "below," "lower," "above," "upper" and the like, are used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus is otherwise oriented (rotated 90 degrees or at other orientations) and the spatially relative descriptors used herein likewise are interpreted accordingly.

Terms like "user equipment," "mobile station," "mobile," "mobile device," "subscriber station," "subscriber equipment," "access terminal," "terminal," "handset," and similar terminology, refer to a wireless device utilized by a subscriber or user of a wireless communication service to receive or convey data, control, voice, video, sound, gaming, data-streaming or signaling-streaming. The foregoing terms are utilized interchangeably in the subject specification and related drawings. The terms "access point," "base station," "Node B," "evolved Node B (eNode B)," next generation Node B (gNB), enhanced gNB (en-gNB), home Node B (HNB)," "home access point (HAP)," or the like refer to a wireless network component or apparatus that serves and receives data, control, voice, video, sound, gaming, data-streaming or signaling-streaming from UE.

To allow data retrieval through an Ego Vehicle API, user authentication is performed. However, allowing users to have direct access to database via authentication presents several problems. For example, tracking what the user is really doing is harder because the database is large. Thus, a complex access border definition is used. Users are also able to design complex queries to access data, but this is not as scalable and maintainable. Further, having a large number of users to access database data leads to data leakage and makes data encapsulation harder.

In at least one embodiment, a method is provided for authenticating access by a user to a database using a multistep process. The method includes receiving a User Request for accessing a Database, the User Request including a User Authorization Token, a Request Identification (ID), and an Event Date. The user is authenticated based on the User Authorization Token. In response to the user not being authenticated based on the User Authorization Token, the user is denied access to the Database. In response to the user being authenticated based on the User Authorization Token, an Authenticated Request is provided to an Access Credential Server based on the User Request. Based on the Authenticated Request, a Service Key for accessing the Database is obtained. The Database is accessed using the Service Key.

Embodiments described herein provide method that provides one or more advantages. For example, the method according to at least one embodiment uses multiple two authentication steps to access data stored in an external database. Users are authenticated at an HTTP API level by using access tokens, but those tokens cannot be used to directly access to the database. According to at least one embodiment, multiple steps of authentication are involved. A first authentication is to authenticate the user using a User Authentication Token. The second authentication is for granting an application access to the database. This will force users to access data through the API and allow better query design by API developers that will be automatically shared among API users. Also, since users cannot access the database directly, developers now have the chance to filter and change data encapsulation strategies easily through the API. For implementation of the API, users are authenticated at the HTTP request side, but an application key is provided to access the database, which is not accessible or visible to users.

An autonomous vehicle analyzes data to understand where the vehicle is going, detect and avoid hazards, and transport passengers safely with little or no human input. Data collection includes retrieving data captured from one or more sensors within the vehicle and from neighboring devices in the environment of the vehicle. Thus, autonomous vehicles rely on the collection and processing of massive amounts of data. Real-time data about the environment, e.g., weather, road conditions, other vehicles, pedestrians and street signs, and the like, combined with information about the vehicle and the intelligence used to make instant driving decisions, is able to generate several terabytes of data per hour for one test vehicle. That data is analyzed for real-time events as managed by the vehicle, but later the data is analyzed by manufacturers, scene by scene, to identify novel driving conditions that can be used to inform the AI that underlies the vehicle's autonomous operations.

Capabilities of the vehicle system are also able to be tailored based on a priority level of a requesting user. For example, different users are able to have different priority levels for accessing data. Priority levels are set based on the type of customer, e.g., government, police, retailer, entertainment, etc. Further, software developers seek access to the database for developing new applications.

FIG. 1 illustrates data collection in an autonomous driving environment 100 according to at least one embodiment.

In FIG. 1, autonomous vehicles 110, 120, 130 are shown. Autonomous Vehicle 110 includes at least sensor 112, and sensor 114. Autonomous Vehicle 120 includes at least sensor 122, and sensor 124. Autonomous Vehicle 130 includes at least sensor 132, and sensor 134. Autonomous Vehicles 110, 120, 130 are capable of including more sensors. Such sensors include cameras, Radio Detection And Ranging (RaDAR) sensors, Light Detection and Ranging (LiDAR) based sensors, Infrared (IR) sensors, and the like.

Wireless communication in autonomous vehicles 110, 120, 130 refers to the exchange of information between these vehicles and other devices via Networks 140. Wireless communication allows data to be shared with other vehicles, infrastructure, and connected devices, such as traffic lights, road sensors, and the like. The sharing of data via wireless communication enables a more coordinated and efficient transportation system. Wireless standards enable communication between autonomous vehicles, allowing them to exchange information such as speed, direction, and location. This communication helps in coordinating and avoiding potential collisions, enhancing overall road safety.

Self-driving vehicles use various wireless technologies, such as cellular networks, Wi-Fi, and V2X (Vehicle-to-Everything) communication protocols, including V2V (Vehicle-to-Vehicle), V2I (Vehicle-to-Infrastructure), and V2P (Vehicle-to-Pedestrian). By connecting to a network, these vehicles can access vast amounts of data, such as high-definition maps, weather conditions, traffic patterns, and updates about construction work or accidents.

A server is able to collect data from the autonomous vehicles 110, 120, 130 as well as from infrastructure, and connected devices, such as traffic lights 150, road sensors 160, 162, 164, and the like. Data is stored in a database in a Server 170, and is able to be provided to autonomous vehicles 110, 120, 130, or to be accessed by different users.

In addition to providing the data in Server 170 back to the autonomous vehicles 110, 120, 130, other users desire access to the data in Server 170. For example, test engineers and application developers are able to use the data in Server 170 in test applications in closed Software-In-The-Loop (SIL) tests without access to a real vehicle.

Figure 2:
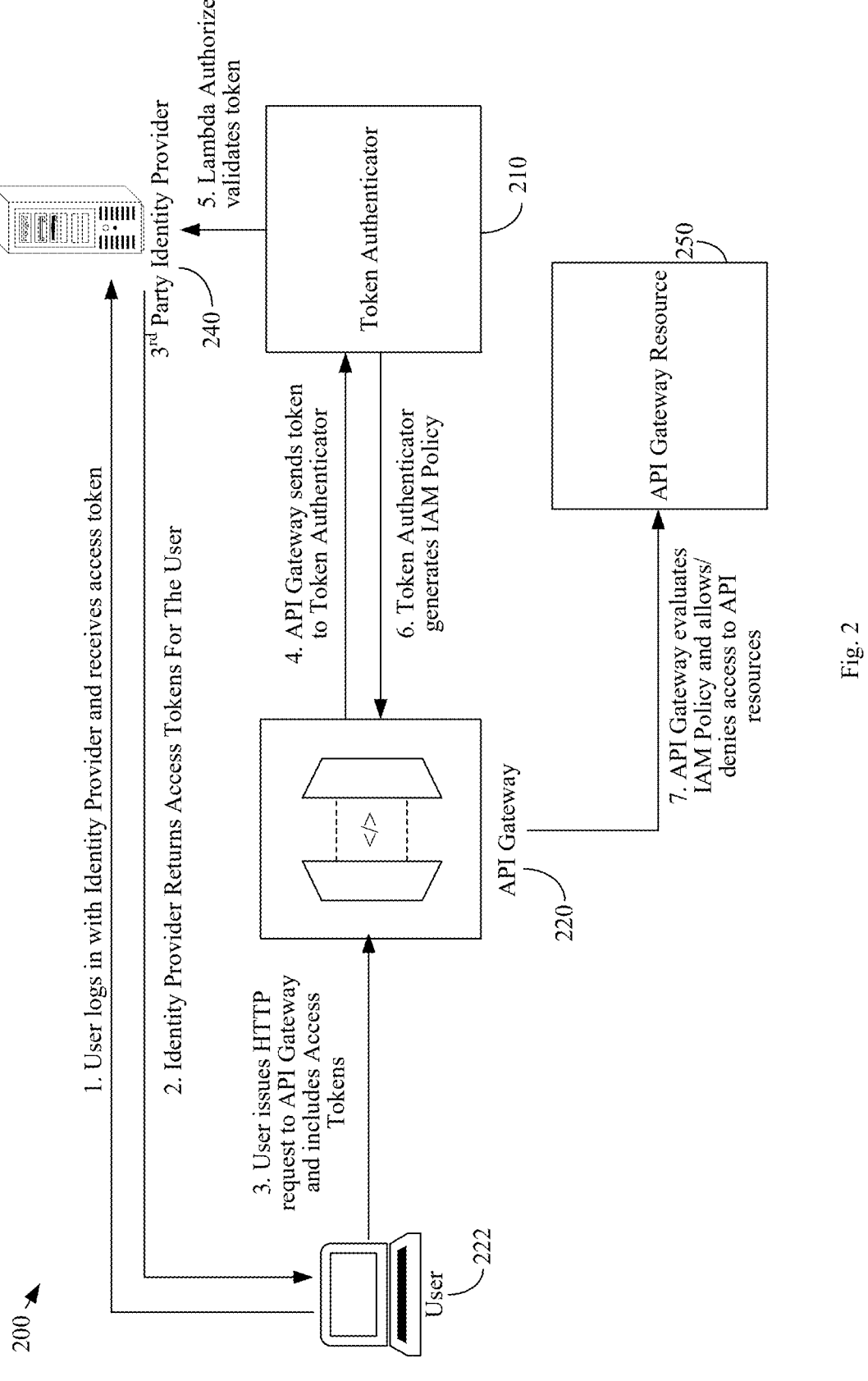
FIG. 2 illustrates operation of a Lambda Authorizer for authorizing a user.

FIG. 2 illustrates operation of a Lambda Authorizer for authorizing a user 200.

In FIG. 2, a function of a Token Authenticator 210 is used to control access to an HTTP API Gateway 220. A User 222 logs in with a 3rd Party Identity Provider 240.

The 3rd Party Identity Provider 240 creates, manages, and maintains identity information for organizations. After a successful login, the 3rd Party Identity Provider 240 issues an access token to a client. The 3rd Party Identity Provider 240 issues a cryptographically signed token to the User 222, wherein the token includes information about the user identity and permissions associated with the User 222.

After obtaining the token, the User 222 issues an HTTP Request to an API Gateway 220, wherein the request incudes the access token. The API Gateway 220 forwards the token to the Token Authenticator 210. In order to use the tokens to access resources (e.g., a Database, a Server, or the like), authorization code is defined using the function to map token characteristics to Gateway resources and permissions.

The Token Authenticator 210 executes the authorization logic and creates an Identity Management Policy (IAM). The Token Authenticator 210 invokes the function to authenticate the token with the 3rd Party Identity Provider 240. The Token Authenticator 210 forwards a response to the API Gateway 220.

The API Gateway 220 evaluates the IAM against the API Gateway Resource 250 (e.g., a Database, a Server, or the like) that the User 222 requested to determine whether the User 222 is authorized to access the API Gateway 220 and thus API Gateway Resources 250. The API Gateway 220 either allows or denies the request by the User 222. If allowed, the API Gateway 220 forwards the request from User 222 to the API Gateway Resource 250.

Figure 3:
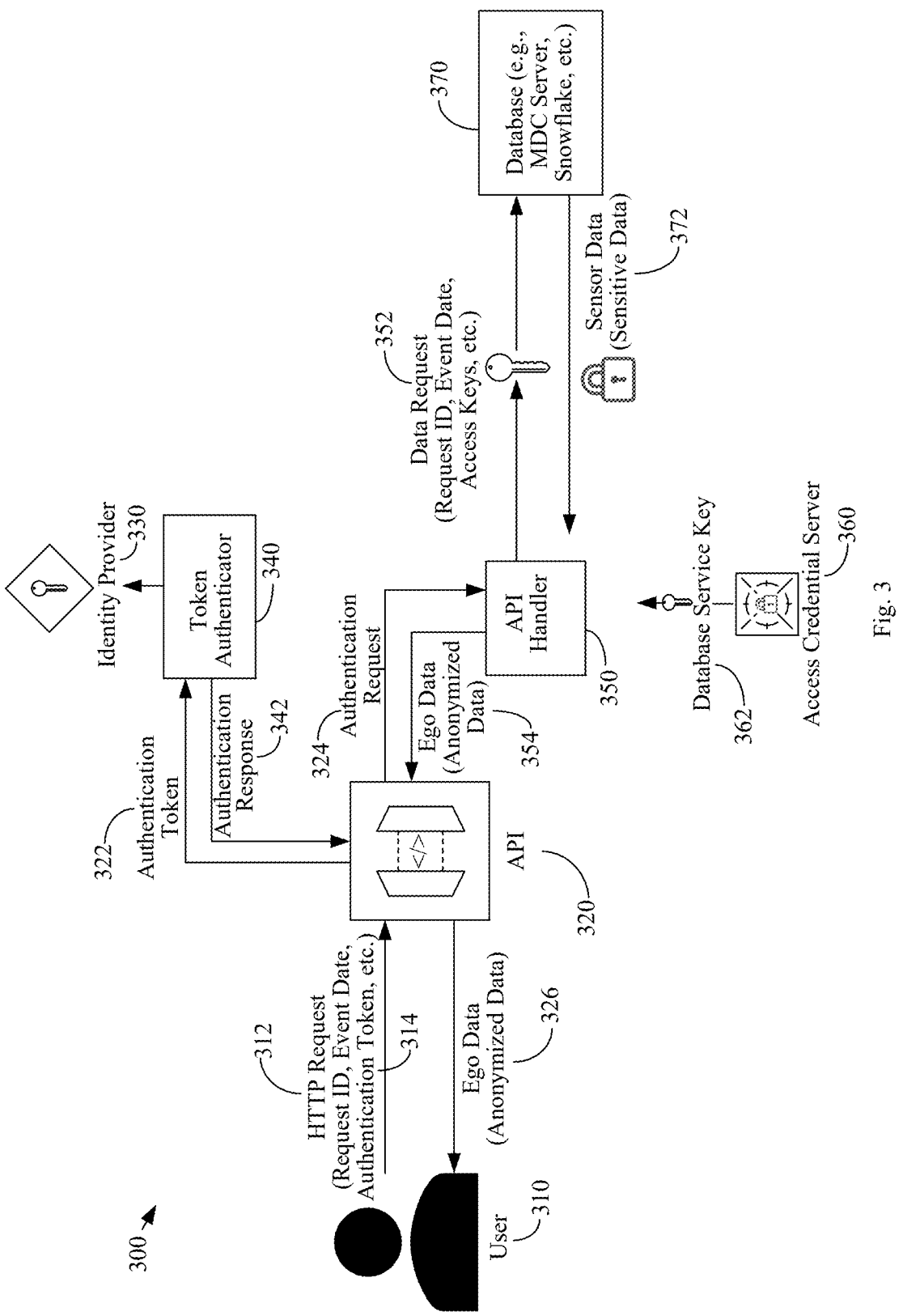
FIG. 3 illustrates a multi-step process for authenticating access by a user to a database (or other controlled resource) according to at least one embodiment.

FIG. 3 illustrates a multi-step process for authenticating access by a user to a database (or other controlled resource) 300 according to at least one embodiment.

In FIG. 3, a User 310 accesses an Application Programming Interface (API) 320 to request vehicle data. For example, the User 310 accesses the API 320 through a web browser and generates an HTTP Request 312 for the vehicle data. API 320 sometimes is also referred to as Gateway API. Through the web browser, the User 310 is able to provide the API 320 through the HTTP Request 312 a Request Identification (ID) and Event Date. The HTTP Request 312 also includes an Authentication Token 314 that, as described above for example with reference to FIG. 2, the User obtains from an Identity Provider 330 to control access to the API 320. The Authentication Token (bearer token) 314 is automatically provided when the User 310 uses an UI, such as DataLens, or is provided manually by the User 310 after first acquiring an Authentication Token 314 with the Identity Provider 330 after logging into the Identity Provider 330 (as described above with reference to FIG. 2).

The API 320 forwards Authentication Token 322 to a Lambda Authorizer 340. The Lambda Authorizer 340 invokes the Lambda function to authenticate the User 310 with the Identity Provider 330 based on the Authentication Token 322. The Lambda Authorizer 340 then forwards a Authentication Response 342 to the API 320. Thus, the API

320 identifies users individually, and handles individual authentication to the API 320 by the User 312 through the Lambda Authorizer 340. The Authentication Response 342 is usable to indicate unsuccessful authorization of the User or successful authorization of the User. For example, the unsuccessful authorization of the user is able to result in response to the User not providing an Authentication Token 314 in the HTTP Request 312, the Authentication Token 322 not being authenticated by the Lambda Authorizer 340/Identity Provider 330, or the Authentication Token 322 being expired.

Upon unsuccessful authorization of the User 310, the API 320 denies access to data by the User 310. In response to the User 310 not being authenticated, e.g., not being authorized to access the API Gateway Ego API 320, then the User 310 is unable to proceed further.

Upon successful authorization of the User 310, the API 320 sends an Authenticated Request 324, including the Request ID and Event Date, to an API Handler 350.

The API Handler 350, based on the Authenticated Request 324, obtains a Database Service Key 362 from an Access Credential Server 360 to access resources (e.g., a Database 370, a Server, or the like). Thus, the API Handler 350 obtains its own credentials for the external Database 370. A Service Role associated with the Database 370 and an Asymmetric Access Key (Database Service Key 362) are used to determine whether to allow the API 320 to access tables in the Database 370. The User 310 creates a Service Role, and a private key of the User 310 is registered within the Database 370 so that the Database 370 is able to grant access to the data in the Database 370 based on the Service Role. The Service Role identifies a User 310 that represents the HTTP API Service within the Database 370. Accordingly, access to the API 320 is controlled per user, but access to the Database 370 is controlled via a Service Account and a Service Role for the User 310 associated with the data in the Database 370 based on the Database Service Key 362. Services, such as the Database 370, store and use secrets in the Access Credential Server 360. Access Credential Server 360 is a secure and convenient storage system for API keys, passwords, certificates, and other sensitive data. Access Credential Server 360 provides a central place and a source of truth to manage, access, and audit secrets across the cloud. Access Credential Server 360 manages, retrieves, and rotates database credentials, application credentials, OAuth tokens, API keys, and other secrets throughout their lifecycles. The Database Service Key 362 in Access Credential Server 360 is periodically rotated by using a function that will update configurations of the Database 370 for the User 310 as well as the public key (Database Service Key 362) within the Access Credential Server 360. For example, the Database Service Key 362 is able to be automatically rotated each month.

API Handler 350 sends a Data Request 352 for data in the Database 370 based on Role associated with Database Servicer Key 362. The Data Request 352 includes Request ID, Event Data, Database Service Key, and the like, for accessing the Database 370.

Database 370 analyzes the Database Service Key 362 received in the Data Request 352 from the API Handler 350 to identify a Service Account and a Service Role associated with the Database 370.

In responses to the Data Request 352 (Request ID, Event Data, Database Service Key, and the like), the Database 370 returns Un-anonymized Sensor Data 372 (e.g., sensitive data) in the Database 370 to the API Handler 350.

API Handler 350 anonymizes the sensitive data (e.g., converts the sensitive data to anonymized data) to produce anonymized data (L2 data) 354 and provides the anonymized data 354 to the API 320. The API 320 then provides the anonymized Ego Data (anonymized data) 326 to the User 310.

Thus, access to the API 320 is controlled per user, but access to the external Database 370 is controlled via a service account and a Service Role of the User associated with the Database 370 based on the Database Service Key 362. According to at least one embodiment, a Service Role associated with the Database 370 and an Asymmetric Access Key (Database Service Key 362) are used to determine whether to allow the API 320 to access tables in the Database 370. The authentication process of the User 310 is performed by API 320 and Token Authenticator 340, wherein Authenticated Requests 324 are then forwarded to the API Handler 350.

According to at least one embodiment, to enable access to resources (e.g., a Database 370, a Server, or the like), the API Handler 350 retrieves the Database Service Key 362 from the Access Credential Server 360 and uses the Database Service Key 362 to perform Data Requests 352 for data from the Database 370. The User 310 creates an asymmetric key pair for the application, stores the private key (Database Service Key 362) in the Access Credential Server 360 to be retrieved by the API Handler 350 to access the Database 370, generates the public key (Database Service Key 362) from the private key, and registers the public key (Database Service Key 362) in the Database 370 where the public key (Database Service Key 362) is associated with the User 310. A Role is created, wherein the Role identifies the User 310 associated with the HTTP API Service within the Database 370. The public key (Database Service Key 362) of the User is registered within the Database 370 and the associated Role is granted to the User 310 through the API Handler 350.

Having the individual Users 310 access the Database 370 directly or just go through one API Handler 350 is a problem. For example, allowing an application to have its own Database Service Key 362 allows a user to establish a session having a token to validate the session. However, having a single level of authentication for accessing the Database 370 does not provide fine grained configuration at the user level for determining access to the data in the Database 370 and thus the possibility of data leakage is much higher. Database 370 often has several billion records, and controlling access to the records is difficult using a single level of authentication. Thus, at least one embodiment prevents a user from directly accessing the Database 370 but instead provides a level of data encapsulation, wherein the data is provided through the API 320 and the API Handler 350. The API Handler 350 does not just interface with the Database 370 but also limits the queries that can be submitted to the Database 370 based on the Database Service Key 362 obtained from the Access Credential Server 360.

Another problem is that the User 310 does not know where the data is located in the Database 370. So another advantage of not letting the users directly access the data involves anonymizing the data as well as making data extraction more efficient. The alternative is to allow many users to access the database directly using large queries and the multi-step authentication. This is analogous to a restaurant where instead of allowing users to access the food storage and decide what the users want to order, a menu is provided to the users to make ordering more efficient. In other words, in response to giving users the freedom to code their own queries, the users often construct inefficient queries. For example, users are able to construct the same query in a way that is able to overload the system by using many more resources to retrieve the data in response to the query. Users 310 do not know where the data is located, do not know how to design an efficient query, and are able to access data that Users 310 are not authorized to access. Thus, embodiments described herein provide access to data that is not just more secure, but provides a system that is more stable.

FIG. 4 is a flowchart 400 of a method for authenticating access by a user to a database using a multi-step process according to at least one embodiment.

In FIG. 4, the process starts S402 and a User Request for accessing a resource (e.g., a Database, a Server, or the like) is received at an Application Programming Interface (API), the User Request including a User Authorization Token, a Request Identification (ID), and an Event Date S410. Referring to FIG. 3, a User 310 accesses an Application Programming Interface (API) 320 to request vehicle data. For example, the User 310 accesses the API 320 through a web browser and generates an HTTP Request 312 for the vehicle data. API 320 sometimes is also referred to as Gateway API. Through the web browser, the User 310 is able to provide the API 320 through the HTTP Request 312 a Request Identification (ID) and Event Date. The HTTP Request 312 also includes an Authentication Token 314 that, as described above for example with reference to FIG. 2, the User obtains from an Identity Provider 330 to control access to the API 320. The Authentication Token (bearer token) 314 is automatically provided when the User 310 uses an UI, such as DataLens, or is provided manually by the User 310 after first acquiring an Authentication Token 314 with the Identity Provider 330 after logging into the Identity Provider 330 (as described above with reference to FIG. 2).

A determination is made whether the User is Authenticated based on a User Authorization Token S414.

In response to the user not being authenticated at the API based on the User Authorization Token, access to the resource is denied S418. Referring to FIG. 3, upon unsuccessful authorization of the User 310, the API 320 denies access to data by the User 310. In response to the User 310 not being authenticated, e.g., not being authorized to access the API 320, then the User 310 is unable to proceed further.

In response to the user being authenticated based on the User Authorization Token S422, the next authentication process is initiated S426.

The user at the API is authenticated based on the User Authorization Token S430. Referring to FIG. 3, the API 320 forwards Authentication Token 322 to a Token Authenticator 340. The Token Authenticator 340 invokes the function to authenticate the User 310 with the Identity Provider 330 based on the Authentication Token 322. The Token Authenticator 340 then forwards a Authentication Response 342 to the API 320. Thus, the API 320 identifies users individually, and handles individual authentication to the API 320 by the User 312 through the Token Authenticator 340. The Authentication Response 342 is usable to indicate unsuccessful authorization of the User or successful authorization of the User. For example, the unsuccessful authorization of the user is able to result in response to the User not providing an Authentication Token in the HTTP Request 312, the Authentication Token 322 not being authenticated by the Token Authenticator 340/Identity Provider 330, or the Authentication Token 322 being expired.

An Authenticated Request is provided from the API to an API Handler based on the User Request in response to the user being authenticated at the API based on the User Authorization Token S434. Referring to FIG. 3, upon successful authorization of the User 310, the API 320 sends an Authenticated Request 324, including the Request ID and Event Date, to an API Handler 350.

The API Handler obtains from an Access Credential Server a Service Key for accessing the Database by the API Handler based on the Authenticated Request S438. Referring to FIG. 3, the API Handler 350, based on the Authenticated Request 324, obtains a Database Service Key 362 from an Access Credential Server 360 to access resources (e.g., a Database 370, a Server, or the like). Thus, the API Handler 350 obtains its own credentials for the external Database 370. A Service Role associated with the Database 370 and an Asymmetric Access Key (Database Service Key 362) are used to determine whether to allow the API 320 to access tables in the Database 370. The User 310 creates a Service Role, and a private key of the User 310 is registered within the Database 370 so that the Database 370 is able to grant access to the data in the Database 370 based on the Service Role. The Service Role identifies a User 310 that represents the HTTP API Service within the Database 370. Accordingly, access to the API 320 is controlled per user, but access to the Database 370 is controlled via a Service Account and a Service Role for the User 310 associated with the data in the Database 370 based on the Database Service Key 362. Services, such as the Database 370, store and use secrets in Access Credential Server 360. Access Credential Server 360 is a secure and convenient storage system for API keys, passwords, certificates, and other sensitive data. Access Credential Server 360 provides a central place and single source of truth to manage, access, and audit secrets across the cloud. Access Credential Server 360 manages, retrieves, and rotates database credentials, application credentials, OAuth tokens, API keys, and other secrets throughout their lifecycles. The Database Service Key 362 in Access Credential Server 360 is periodically rotated by using a function that will update configurations of the Database 370 for the User 310 as well as the public key (Database Service Key 362) within the Access Credential Server 360. For example, the Database Service Key 362 is able to be automatically rotated each month.

The API Handler accesses the Database using the Service Key S438. Referring to FIG. 3, API Handler 350 sends a Data Request 352 for data in the Database 370 based on Role associated with Database Servicer Key 362. The Data Request 352 includes Request ID, Event Data, Database Service Key, and the like, for accessing the Database 370.

The Database analyzes the Service Key received from the API Handler to identify a Service Account and a Service Role associated with the Database S442. Referring to FIG. 3, Database 370 analyzes the Database Service Key 362 received in the Data Request 352 from the API Handler 350 to identify a Service Account and a Service Role associated with the Database 370.

Data from the Database is returned to the API Handler S446. Referring to FIG. 3, in response to the Data Request 352 (Request ID, Event Data, Database Service Key, and the like), the Database 370 returns Un-anonymized Sensor Data 372 (e.g., sensitive data) in the Database 370 to the API Handler 350.

The data returned to the API Handler from the Database is provided to the API S450. Referring to FIG. 3, API Handler 350 anonymizes the sensitive data (e.g., converts the sensitive data to anonymized data) to produce anonymized data 354 and provides the anonymized data 354 to the API 320.

The returned data is presented to the user S454. Referring to FIG. 3, the API 320 then provides the anonymized Ego Data (anonymized data) 326 to the User 310.

The Service Key is automatically rotated periodically by the Access Credential Server S458. Referring to FIG. 3, Access Credential Server 360 provides a central place and single source of truth to manage, access, and audit secrets across the cloud. Access Credential Server 360 manages, retrieves, and rotates database credentials, application credentials, OAuth tokens, API keys, and other secrets throughout their lifecycles. The Database Service Key 362 in Access Credential Server 360 is periodically rotated by using a function that will update configurations of the Database 370 for the User 310 as well as the public key (Database Service Key 362) within the Access Credential Server 360. For example, the Database Service Key 362 is able to be automatically rotated each month.

The process then terminates S470.

At least one embodiment provides a method for authenticating access by a user to a database using a multi-step process. The method includes receiving, at a Gateway API, a User Request for accessing a resource, the User Request including a User Authorization Token, a Request Identification (ID), and an Event Date. The user is authenticated at the Gateway API based on the User Authorization Token. In response to the user not being authenticated at the Gateway API based on the User Authorization Token, the user is denied access to the resource. In response to the user being authenticated at the Gateway API based on the User Authorization Token, an Authenticated Request is provided from the Gateway API to an API Handler based on the User Request. Based on the Authenticated Request, the API Handler obtains, from a Access Credential Server, a Service Key for accessing the Database by the API Handler. The API Handler accesses the Database using the Service Key.

Figure 5:
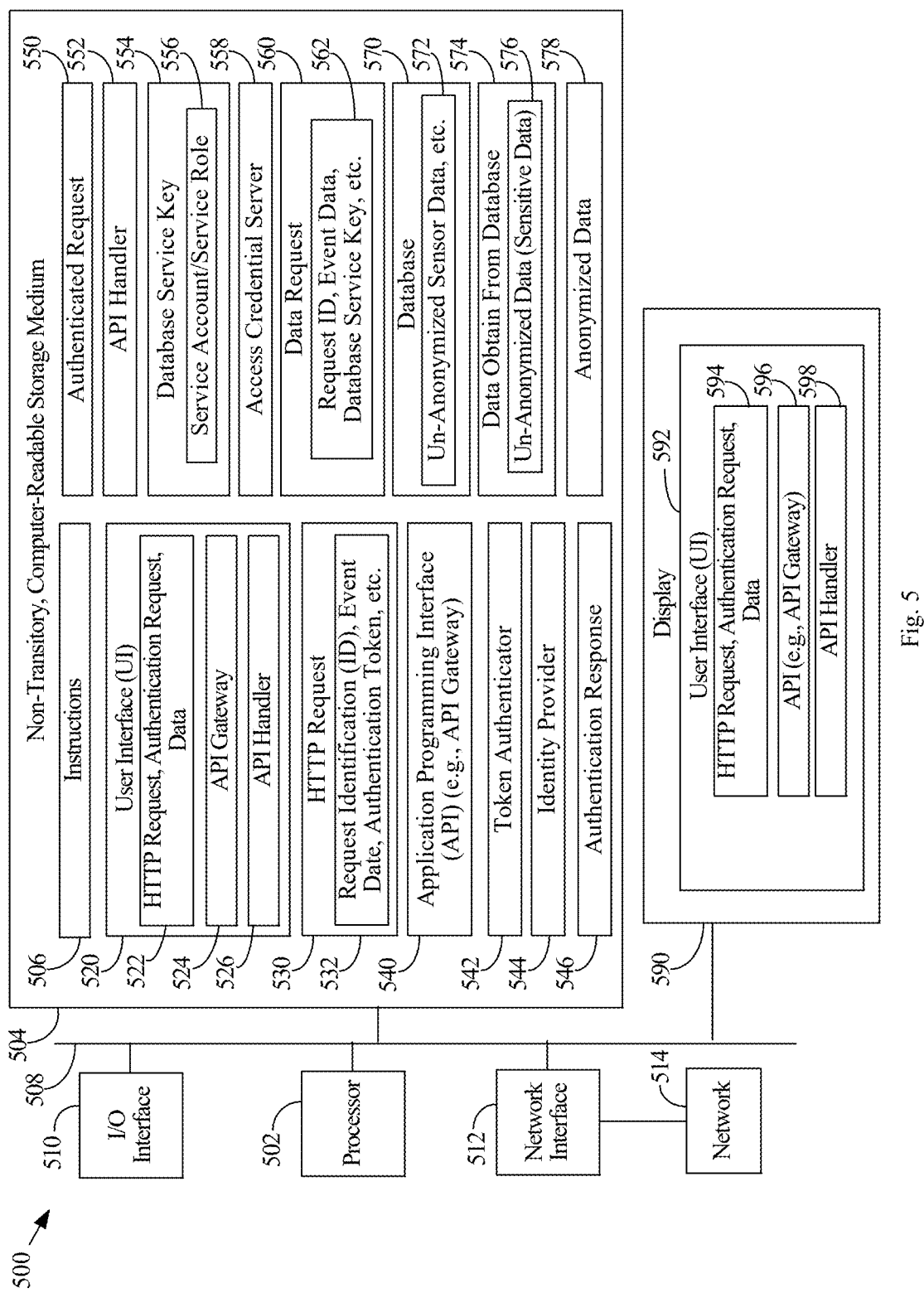
FIG. 5 is a high-level functional block diagram of a processor-based system according to at least one embodiment.

FIG. 5 is a high-level functional block diagram of a processor-based system 500 according to at least one embodiment.

In at least one embodiment, processing circuitry 500 provides a multi-step process for authenticating access by a user to a database. Processing circuitry 500 implements a multi-step process for authenticating access by a user to a database using Processor 502. Processing circuitry 500 also includes a Non-Transitory, Computer-Readable Storage Medium 504 that is used to implement a multi-step process for authenticating access by a user to a database. Non-Transitory, Computer-Readable Storage Medium 504, amongst other things, is encoded with, i.e., stores, Instructions 506, i.e., computer program code, that are executed by Processor 502 causes Processor 502 to perform operations for implementing a multi-step process for authenticating access by a user to a database. Execution of Instructions 506 by Processor 502 represents (at least in part) an application which implements at least a portion of the methods described herein in accordance with one or more embodiments (hereinafter, the noted processes and/or methods).

Processor 502 is electrically coupled to Non-Transitory, Computer-Readable Storage Medium 504 via a Bus 508. Processor 502 is electrically coupled to an Input/Output (I/O) Interface 510 by Bus 508. A Network Interface 512 is also electrically connected to Processor 502 via Bus 508. Network Interface 512 is connected to a Network 514, so that Processor 502 and Non-Transitory, Computer-Readable Storage Medium 504 connect to external elements via Network 514. Processor 502 is configured to execute Instructions 506 encoded in Non-Transitory, Computer-Readable Storage Medium 504 to cause processing circuitry

500 to be usable for performing at least a portion of the processes and/or methods. In one or more embodiments, Processor 502 is a Central Processing Unit (CPU), a multi-processor, a distributed processing system, an Application Specific Integrated Circuit (ASIC), and/or a suitable processing unit.

Processing circuitry 500 includes I/O Interface 510. I/O interface 510 is coupled to external circuitry. In one or more embodiments, I/O Interface 510 includes a keyboard, keypad, mouse, trackball, trackpad, touchscreen, and/or cursor direction keys for communicating information and commands to Processor 502.

Processing circuitry 500 also includes Network Interface 512 coupled to Processor 502. Network Interface 512 allows processing circuitry 500 to communicate with Network 514, to which one or more other computer systems are connected. Network Interface 512 includes wireless network interfaces such as Bluetooth, Wi-Fi, Worldwide Interoperability for Microwave Access (WiMAX), General Packet Radio Service (GPRS), or Wideband Code Division Multiple Access (WCDMA); or wired network interfaces such as Ethernet, Universal Serial Bus (USB), or Institute of Electrical and Electronics Engineers (IEEE) 864.

Processing circuitry 500 is configured to receive information through I/O Interface 510. The information received through I/O Interface 510 includes one or more of instructions, data, design rules, libraries of cells, and/or other parameters for processing by Processor 502. The information is transferred to Processor 502 via Bus 508. Processing circuitry 500 is configured to receive information related to a User Interface (UI) through I/O Interface 510. The information is stored in Non-Transitory, Computer-Readable Storage Medium 504 as UI 520.

In one or more embodiments, one or more Non-Transitory, Computer-Readable Storage Medium 504 having stored thereon Instructions 506 (in compressed or uncompressed form) that may be used to program a computer, processor, or other electronic device) to perform processes or methods described herein. The one or more Non-Transitory, Computer-Readable Storage Medium 504 includes one or more of an electronic storage medium, a magnetic storage medium, an optical storage medium, a quantum storage medium, or the like.

For example, the Non-Transitory, Computer-Readable Storage Medium 504 may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. In one or more embodiments using optical disks, the one or more Non-Transitory Computer-Readable Storage Media 504 includes a Compact Disk-Read Only Memory (CD-ROM), a Compact Disk-Read/Write (CD-R/W), and/or a Digital Video Disc (DVD).

In one or more embodiments, Non-Transitory, Computer-Readable Storage Medium 504 stores Instructions 506 configured to cause Processor 502 to perform at least a portion of the processes and/or methods for a multi-step process for authenticating access by a user to a database. In one or more embodiments, Non-Transitory, Computer-Readable Storage Medium 504 also stores information, such as algorithm which facilitates performing at least a portion of the processes and/or methods for a multi-step process for authenticating access by a user to a database.

Accordingly, in at least one embodiment, Processor 502 executes Instructions 506 stored on the one or more Non-Transitory, Computer-Readable Storage Medium 504 to implement a multi-step process for authenticating access by a user to a database. A User Interface 520 presents information 522 including an HTTP Request, Authenticated Request, Data, and the like. User Interface 520 also presents at least an Application Programming Interface (API) 524 and an API Handler 526. Processor 502 receives, at an API 540, an HTTP Request 530 for a User for accessing a resource (e.g., Database 570, a Server, or the like), the HTTP Request 530 including a User Authorization Token, a Request Identification (ID), and an Event Date 532. Processor 502 presents a user interface of the API 540 to the user via a web browser, and receives the HTTP Request 530 via the web browser at the API 540. Processor 502 uses API 540 to authenticate the user based on an Authorization Token 532 in the HTTP Request 530. Processor 502 causes API 540 to send a Token Authenticator 542 an Authentication Token 532 from the HTTP Request 530, wherein the Processor causes Token Authenticator 542 to send an Identity Provider 544 the Authentication Token 532 from the HTTP Request 530. Processor 502 causes Identity Provider 544 to return an Authentication Response 546 based on the Authentication Token 532 to Token Authenticator 542, wherein Token Authenticator 542 returns the Authentication Response 546 to the API 540. In response to the user not being authenticated at the API 540 based on the Authorization Token 532, Processor 502 denies the user access to the resource. In response to the user being authenticated at the API 540 based on the Authorization Token 532, Processor 502 causes the API 540 to send an Authenticated Request 550 to a API Handler 552. Based on the Authenticated Request 550, Processor 502 causes the API Handler 552 to obtain from an Access Credential Server 558 a Database Service Key 554 for accessing the Database 570 by the API Handler 552. Processor 502 causes the API Handler 552 to send a Data Request 560 that includes a Request ID, Event Date, Database Service Key 562 to the Database 570. The Database 570 stores Un-Anonymized Data 572. Processor 502 causes the Database 570 to analyze the Database Service Key 554 received from the Vehicle API Handler 552 to identify a Service Account and a Service Role 556 associated with the user in the Database 570. Based on the Database Service Key 554, Processor 502 obtains data from the Database 574 in response to the Data Service Key 554 including Un-Anonymized Data 576 that is returned to the API Handler 552. Processor 502 uses the API Handler 552 to anonymize the Un-Anonymized Data 576 to generate Anonymized Data 578 and to provide the Anonymized Data to the API 540, wherein the Anonymized Data 578 is presented to the user. Processor 502 automatically rotates the Database Service Key 554 periodically in the Access Credential Server 558. Display 590 presents a User Interface (UI) 592, wherein UI 592 presents information 594 including an HTTP Request, an Authenticated Request, and data, such as data obtained from Database 570. UI 592 also presents API 596 and Vehicle Handler 598 as described above.

Embodiments described herein provide method that provides one or more advantages. For example, the method according to at least one embodiment uses multiple authentication steps to access data stored in an external database. An API is used to authenticate users at an HTTP API level by using access tokens, but those tokens cannot be used to directly access to the database. According to at least one embodiment, multiple steps of authentication are involved. A first authentication is to authenticate the user. The second authentication is for granting an application access to the database. This will force users to access data through the API and allow better query design by API developers that will be automatically shared among API users. Also, since users cannot access the database directly, developers now have the chance to filter and change data encapsulation strategies easily through the API. For implementation of the API, users are authenticated at the HTTP request side, but an application key is provided to access the database, which is not accessible or visible to users.

An aspect of this description is directed to a method [1] for authenticating access by a user to a database using a multi-step process includes receiving a User Request for accessing a Database, the User Request including a User Authorization Token, a Request Identification (ID), and an Event Date, authenticating the user based on the User Authorization Token, in response to the user not being authenticated based on the User Authorization Token, denying the user access to the Database, in response to the user being authenticated based on the User Authorization Token, providing an Authenticated Request to an Access Credential Server based on the User Request, based on the Authenticated Request, obtaining, from Access Credential Server, a Service Key for accessing the Database, and accessing the Database using the Service Key.

The method described in [1], further includes access data from the Database, receiving returned data from the Database, and presenting the returned data to the user.

The method described in any one of [1] or [2], wherein the returning the data from the Database includes returning sensitive data, and anonymizing the sensitive data to generate anonymized data.

The method described in any one of [1] to [3], further includes automatically rotating the Service Key periodically by the Secret Manager.

The method described in any one of [1] to [4], further includes analyzing, by the Database, the Service Key received from the Access Credential Server to identify a Service Account and a Service Role associated with the Database.

The method described in any one of [1] to [5], wherein the receiving the User Request for accessing a Database includes presenting a user interface to the user via a web browser, and receiving an HTTP request via the web browser, the HTTP Request being the User Request.

The method described in any one of [1] to [5], wherein the authenticating the user includes providing the User Authorization Token to a Token Authenticator, and authenticating, by the Token Authenticator using an Identity Provider, an identity of the user based on the User Authorization Token.

An aspect of this description is directed to a system [8] for authenticating access by a user to a database using a multi-step process, including a memory storing computer-readable instructions, and a processor connected to the memory, wherein the processor is configured to execute the computer-readable instructions to perform operations to receive a User Request for accessing a Database, the User Request including a User Authorization Token, a Request Identification (ID), and an Event Date, authenticate the user based on the User Authorization Token, in response to the user not being authenticated based on the User Authorization Token, deny the user access to the Database, in response to the user being authenticated based on the User Authorization Token, provide an Authenticated Request to an Access Credential Server based on the User Request, based on the Authenticated Request, obtain from the Access Credential Server a Service Key for accessing the Database, and access the Database using the Service Key.

The system described in [8], wherein the processor is further configured to receive data from the Database, receive returned data from the Database, and present the returned data to the user.

The system described in any one of [8] or [9], wherein the processor is further configured to receive the data from the Database by receiving sensitive data from the Database, and anonymizing the sensitive data to generate anonymized data.

The system described in any one of [8] to [10], wherein the processor is further configured to automatically rotate the Service Key periodically at the Access Credential Server.

The system described in any one of [8] to [11], wherein the processor is further configured to analyze the Service Key received from the Access Credential Server to identify a Service Account and a Service Role associated with the Database.

The system described in any one of [8] to [12], wherein the processor is further configured to receive the User Request for accessing a Database by presenting a user interface to the user via a web browser, and receiving an HTTP request via the web browser, the HTTP Request being the User Request.

The system described in any one of [8] to [13], wherein the processor is further configured to authenticate the user by providing the User Authorization Token to a Token Authenticator, and receive authentication of the user from an Identity Provider based on the User Authorization Token.

An aspect of this description is directed to a non-transitory computer-readable media having computer-readable instructions stored thereon [15], which when executed by a processor causes the processor to perform operations including receiving a User Request for accessing a Database, the User Request including a User Authorization Token, a Request Identification (ID), and an Event Date, authenticating the user based on the User Authorization Token, in response to the user not being authenticated based on the User Authorization Token, denying the user access to the Database, in response to the user being authenticated based on the User Authorization Token, providing an Authenticated Request to an Access Credential Server based on the User Request, based on the Authenticated Request, obtaining, from the Access Credential Server, a Service Key for accessing the Database, and accessing the Database using the Service Key.

The non-transitory computer-readable media described in [15], further includes accessing data from the Database, receiving returned data from the Database, and presenting the returned data to the user, wherein the returning the data from the Database includes receiving sensitive data from the Database, and anonymizing the sensitive data to generate anonymized data.

The non-transitory computer-readable media described in any one of [15] or [16], further includes automatically rotating the Service Key periodically by the Access Credential Server.

The non-transitory computer-readable media described in any one of [15] or [17], further includes analyzing, by the Database, the Service Key received from the Access Credential Server to identify a Service Account and a Service Role associated with the Database.

The non-transitory computer-readable media described in any one of [15] or [18], wherein the receiving the User Request for accessing a Database includes presenting a user interface to the user via a web browser, and receiving an HTTP request via the web browser, the HTTP Request being the User Request.

The non-transitory computer-readable media described in any one of [15] or [19], wherein the authenticating the user includes providing the User Authorization Token to a Token Authenticator, and authenticating, by the Token Authenticator using an Identity Provider, an identity of the user based on the User Authorization Token.

Separate instances of these programs can be executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the embodiments have been described in language specific to structural features or methodological acts, the subject matter defined in the appended claims is not necessarily limited to the specific features or acts described. Rather, the specific features and acts are disclosed as exemplary forms of implementing the claims.

What is claimed is:

1. A method for authenticating access by a user to a database using a multi-step process, comprising:
    generating, by a user, a User Request;
    receiving the User Request for accessing a Database at a Gateway Application Programming Interface (API), the User Request including a User Authorization Token, a Request Identification (ID), and an Event Date;
    authenticating the user based on the User Authorization Token;
    in response to the user not being authenticated based on the User Authorization Token, denying the user access to the Database;
    in response to the user being authenticated based on the User Authorization Token, providing an Authenticated Request, including the Request ID and Event Date, to an API Handler based on the User Request;
    based on the Authenticated Request, obtaining, by the API Handler from an Access Credential Server, a Service Key for accessing the Database; and
    providing, by the API Handler, access by the user to the Database using the Service Key.

2. The method of claim 1 further comprising accessing data from the Database, receiving returned data from the Database, and presenting the returned data to the user.

3. The method of claim 2, wherein the accessing the data from the Database includes returning sensitive data, and anonymizing the sensitive data to generate anonymized data.

4. The method of claim 1 further comprising automatically rotating the Service Key periodically by the Access Credential Server.

5. The method of claim 1 further comprising analyzing, by the Database, the Service Key received from the API Handler to identify a Service Account and a Service Role at the Database associated with the user.

6. The method of claim 1, wherein the receiving the User Request for accessing the Database includes:
    presenting a user interface to the user via a web browser, and
    receiving an HTTP request via the web browser, the HTTP Request being the User Request.

7. The method of claim 1, wherein the authenticating the user includes:
    providing, by the Gateway API, the User Authorization Token to a Token Authenticator, and
    authenticating, by the Token Authenticator using an Identity Provider, an identity of the user based on the User Authorization Token.

8. A system for authenticating access by a user to a database using a multi-step process, comprising:
    a memory storing computer-readable instructions; and
    a processor connected to the memory, wherein the processor is configured to execute the computer-readable instructions to perform operations to:
        generate, by a user, a User Request;
        receive the User Request for accessing a Database at a Gateway Application Programming Interface (API), the User Request including a User Authorization Token, a Request Identification (ID), and an Event Date;
        authenticate the user based on the User Authorization Token;
        in response to the user not being authenticated based on the User Authorization Token, deny the user access to the Database;
        in response to the user being authenticated based on the User Authorization Token, provide an Authenticated Request, including the Request ID and Event Date, to an API Handler based on the User Request;
        based on the Authenticated Request, obtain by the API Handler from an Access Credential Server, a Service Key for accessing the Database; and
        provide, by the API Handler, access by the user to the Database using the Service Key.

9. The system of claim 8, wherein the processor is further configured to access data from the Database, receive the returned data from the Database, and present the returned data to the user.

10. The system of claim 9, wherein the processor is further configured to receive the data from the Database by receiving sensitive data from the Database, and anonymizing the sensitive data to generate anonymized data.

11. The system of claim 8, wherein the processor is further configured to automatically rotate the Service Key periodically at the Access Credential Server.

12. The system of claim 8, wherein the processor is further configured to analyze the Service Key received from the API Handler to identify a Service Account and a Service Role at the Database associated with the user.

13. The system of claim 8, wherein the processor is further configured to receive the User Request for accessing the Database by presenting a user interface to the user via a web browser, and receiving an HTTP request via the web browser, the HTTP Request being the User Request.

14. The system of claim 8, wherein the processor is further configured to authenticate the user by providing, by the Gateway API, the User Authorization Token to a Token Authenticator, and receive authentication of the user from an Identity Provider based on the User Authorization Token.

15. A non-transitory computer-readable media having computer-readable instructions stored thereon, which when executed by a processor causes the processor to perform operations comprising:
    generating, by a user, a User Request;
    receiving the User Request for accessing a Database at a Gateway Application Programming Interface (API), the User Request including a User Authorization Token, a Request Identification (ID), and an Event Date;

authenticating the user based on the User Authorization Token;

in response to the user not being authenticated based on the User Authorization Token, denying the user access to the Database;

in response to the user being authenticated based on the User Authorization Token, providing an Authenticated Request, including the Request ID and Event Date, to an API Handler based on the User Request;

based on the Authenticated Request, obtaining, by the API Handler from an Access Credential Server, a Service Key for accessing the Database; and providing, by the API Handler, access by the user to the Database using the Service Key.

16. The non-transitory computer-readable media of claim 15 further comprising access data from the Database, receiving returned data from the Database, and presenting the returned data to the user, wherein the receiving the returned data from the Database includes receiving sensitive data from the Database, and anonymizing the sensitive data to generate anonymized data.

17. The non-transitory computer-readable media of claim 15 further comprising automatically rotating the Service Key periodically by the access credential server.

18. The non-transitory computer-readable media of claim 15 further comprising analyzing, by the Database, the Service Key received from the API Handler to identify a Service Account and a Service Role at the Database associated with the user.

19. The non-transitory computer-readable media of claim 15, wherein the receiving the User Request for accessing the Database includes presenting a user interface to the user via a web browser, and receiving an HTTP request via the web browser, the HTTP Request being the User Request.

20. The non-transitory computer-readable media of claim 15, wherein the authenticating the user includes providing, by the Gateway API, the User Authorization Token to a Token Authenticator, and authenticating, by the Token Authenticator using an Identity Provider, an identity of the user based on the User Authorization Token.

* * * * *